United States Patent [19]

Takano et al.

[11] Patent Number: 5,303,005
[45] Date of Patent: Apr. 12, 1994

[54] IMAGE FORMING APPARATUS WITH IMPROVED MAINTENANCE CONTROL

[75] Inventors: Yoshiaki Takano; Tadafumi Shimizu; Hiroyuki Ideyama; Manabu Kamitamari, all of Toyokawa; Kadotari Nishimori, Amagasaki; Yoshihiko Hatta, Toyokawa; Masazumi Ito; Tsugihito Yoshiyama, both of Toyohashi; Yoshifumi Shibata, Toyokawa; Yoshiaki Hata, Ashiya, all of Japan

[73] Assignee: Minolta Camera Kabushiki Kaisha, Osaka, Japan

[21] Appl. No.: 98,244

[22] Filed: Jul. 29, 1993

Related U.S. Application Data

[63] Continuation of Ser. No. 648,130, Jan. 30, 1991, abandoned.

[30] Foreign Application Priority Data

Jan. 31, 1990 [JP] Japan ........................... 2-22712
Jan. 31, 1990 [JP] Japan ........................... 2-22719

[51] Int. Cl.$^5$ ........................................... G03G 21/00
[52] U.S. Cl. ................................... 355/202; 355/204; 355/208; 364/185
[58] Field of Search ............... 355/200, 202, 203, 204, 355/205, 206, 207, 208, 209; 364/184, 185, 186; 358/296, 300; 371/29.1

[56] References Cited

U.S. PATENT DOCUMENTS

| | | | |
|---|---|---|---|
| 3,893,175 | 7/1975 | Solomon | 346/33 M |
| 3,997,873 | 12/1976 | Thornton | 340/149 R |
| 4,167,322 | 9/1979 | Yano et al. | |
| 4,322,813 | 3/1982 | Howard et al. | 364/900 |
| 4,390,953 | 6/1983 | Johnstone | 364/474 |
| 4,398,819 | 8/1983 | Schron | 355/209 |
| 4,497,037 | 1/1985 | Kato et al. | 364/900 |
| 4,549,044 | 10/1985 | Durham | 179/5 R |
| 4,583,834 | 4/1986 | Seko et al. | |
| 4,589,080 | 5/1986 | Abbott et al. | 364/552 |
| 4,739,366 | 4/1988 | Braswell et al. | |
| 4,766,548 | 8/1988 | Cedrone et al. | 364/479 |
| 4,783,748 | 11/1988 | Swarztrauber et al. | 364/483 |
| 4,797,706 | 1/1989 | Sugishima et al. | 358/300 |
| 4,835,671 | 5/1989 | Sato et al. | 364/186 |
| 4,977,426 | 12/1990 | Tani et al. | 355/206 X |
| 4,979,132 | 12/1990 | Sugimoto | 364/520 |
| 4,996,703 | 2/1991 | Gray | 379/40 |
| 4,999,672 | 3/1991 | Rice, Jr. et al. | 355/202 |
| 5,021,826 | 6/1991 | Maruta | 355/205 |
| 5,021,828 | 6/1991 | Yamaguchi et al. | 355/209 |
| 5,023,817 | 6/1991 | Au | 364/550 |
| 5,057,866 | 10/1991 | Hill, Jr. et al. | 355/200 |
| 5,077,582 | 12/1991 | Kravette et al. | 355/206 |
| 5,084,875 | 1/1992 | Weinberger et al. | 371/291 |

FOREIGN PATENT DOCUMENTS

| | | | |
|---|---|---|---|
| 59-142559 | 2/1983 | Japan . | |
| 60-90460 | 5/1985 | Japan . | |
| 63-301667 | 12/1988 | Japan . | |
| 0271767 | 10/1989 | Japan | 355/204 |

OTHER PUBLICATIONS

Research Newsletter, Dataquest, Inc., Feb. 1989, CDIS Newsletter "Remote Diagnostics Tool Kit of the Future" pp. 1–6.

Primary Examiner—A. T. Grimley
Assistant Examiner—Sandra L. Brasé
Attorney, Agent, or Firm—Burns, Doane, Swecker & Mathis

[57] ABSTRACT

A control system of image forming apparatus according to the present invention includes a plurality of image forming apparatus and a control unit connected to each of said image forming apparatus through a communication line.

Each of said image forming apparatus includes a detecting device for detecting contents of maintenance work for the image forming apparatus, and a transmitting device for transmitting the work data showing the detected results by the detecting device to the control unit through the communication line. The control unit includes a receiving device for receiving the work data transmitted from one of the image forming apparatus and a memory for storing the received work data.

30 Claims, 21 Drawing Sheets

FIG.10A

```
== TROUBLE DIAGNOSIS MODE ==
```

☆PHENOMENA
$Z_1$ — · THE DETECTED TEMPERATURE OF THE THERMISTOR IS NOT MORE THAN 135°C.
$Z_2$ — ☆INFORMATION IS INSUFFICIENT, CHECK THE FOLLOWING INFORMATION.
$Z_3$ — ① IS BREAKER ON?      <u>YES</u> / NO
$Z_4$ — ② THE HEATER LAMP WILL BE LIGHTED BY FORCE. VISUALLY CHECK THE LIGHTING CONDITION OF THE HEATER LAMP.
(TURN ON THE ENTER KEY WHEN YOU ARE READY)
$Z_5$ — WAS THE HEATER LAMP LIGHTED?   YES / <u>NO</u>
$Z_6$ — ~ A TROUBLE CAUSE IS NOW ESTIMATED ~

FIG.10B

```
== TROUBLE DIAGNOSIS MODE ==
```

◎ ESTIMATED CAUSE :   A DEFECT IN THE THERMISTOR
CONTAMINANTS IN THE THERMISTOR
A DEFECTIVE IN THE FIXING CONTROL PORTION $Z_{10}$ { AMONG ABOVE ESTIMATED CAUSES, REFERRING TO TROUBLE OCCURENCE IN THE MARKET, A DEFECTIVE IN THE FIXING CONTROL PORTION SEEMS TO BE THE CAUSE. FIRST, REPLACE THE FIXING CONTROL PORTION, AND THEN PERFORM A TROUBLE DIAGNOSIS AGAIN.

=== WORK CONTENT INPUT MODE ===

Z21 {
  CONFIRM IMPLEMENTED ITEMS.
- REPLACEMENT OF
  FIXING CONTROL PORTION    YES / NO
- FIXING ROLLER CLEANING     YES / NO
  THERMISTOR CLEANING      YES / NO
}

IF ANY OTHER ITEMS TO BE IMPLEMENTED, SELECT ITEMS BLOW.

- PARTS REPLACEMEND

- CLEANING

- END OF WORK

FIG.11

TT TROUBLE TABLE

| CAUSE | | | | |
|---|---|---|---|---|
| DEFECTIVE THERMISTOR | CONTAMINANTS IN THERMISTOR | DEFECTIVE FIXING CONTROL PORTION | MEASURE | POSSIBILITY [%] |
| 0.00 | 0.00 | 0.00 | | |
| ⋮ | ⋮ | ⋮ | | |
| 0.00 | 0.00 | 0.00 | THERMISTOR CLEANING | 100 |
| ⋮ | ⋮ | ⋮ | | |
| 0.01 | 0.02 | 0.06 | CONTROL BOARD REPLACEMENT | 80 |
| ⋮ | ⋮ | ⋮ | | |
| 0.02 | 0.02 | 0.00 | THERMISTOR REPLACEMENT | 80 |
| ⋮ | ⋮ | ⋮ | | |

OCCURANCE FREQUENCY

FIG.17A

```
== WORK CONTENTS INPUT MODE ==

⎧ 1  REPLACED PART INPUT
       ⎪
       ⎪ 2  CLEANED PORTION INPUT
  Z31 ⎨
       ⎪ 3  OTHER INPUTS
       ⎪
       ⎩ 4  END OF WORK

Z32 — SELECT NUMBER OF DESIRED MODE WITH
      CURSOR KEY AND ENTER KEY.
```

FIG.17B

```
== REPLACED PART INPUT MODE ==

⎧ ◎ CONFIRM REPLACED PART
   Z33 ⎨
        ⎩ 1. FIXING CONTROL PORTION        YES / NO

⎧ ◎ CHECK OTHER REPLACED
        ⎪   PARTS IF ANY                   YES / NO
        ⎪ 1. PAPER SUPPLY ROLLER
        ⎪    ASSEMBLY                      YES / NO
        ⎪ 2. TRANSPORT ROLLER
   Z34 ⎨    ASSEMBLY                       YES / NO
        ⎪ 3. PHOTORECEPTOR                 YES / NO
        ⎪
        ⎪ 4. DEVELOPING SLEEVE
        ⎪    ROLLER                        YES / NO
        ⎪ ◎ IS THERE ANY OTHER
        ⎩   REPLACED PARTS?                YES / NO
```

FIG.17C

Z35 — CHARGE CALCULATION NEEDED?

YES / NO

FIG.17D

Z36 — THE WORK CHARGE IS 30$

IMAGE FORMING APPARATUS WITH IMPROVED MAINTENANCE CONTROL

This application is a continuation of application Ser. No. 07/648,130, filed Jan. 30, 1991 now abandoned.

CROSS-REFERENCE TO RELATED, COPENDING APPLICATION

Related, copending application of particular interest to the instant application is U.S. Ser. No. 526,900, entitled "Management System for Managing Maintenance Information of Image Forming Apparatus", filed May 22, 1990 and assigned to the same assignee of the instant application.

BACKGROUND OF THE INVENTION

1. Field of the Invention

The present invention relates to image forming apparatus and particularly to image forming apparatus capable of communication with external devices.

2. Description of the Related Art

Image forming apparatus such as copying machines employing the electrophotographic process, facsimiles and optical printers are widely used as means for forming hard copy images. Such image forming apparatus usually include CPUs (Central Processing Unit) including microprocessors and so forth, in which each portion is controlled according to a control program.

Now, conventionally, as described in Japanese Patent Laying-Open No. 59-142559, for example, a control system in which each copying machine and a control unit (host) are connected to each other through a communication line in order to concentrically control a plurality of copying machines has been known.

Copying machines configuring such a control system include means for storing data corresponding to control items and transmit the data to the host according to a command from the host.

Conventional control items were mainly for grasping operational (use) conditions of copying machines, such as the number of copies for each user and sizes of employed paper.

That is, conventional control systems are configured with an object of enabling easy totalization of data for implementing rational use of each copying machine at users having a plurality of copying machines such as official agencies and companies, that is, payment by beneficiaries of maintenance cost and equalization of used amount among users.

Recently, in order to implement high efficiency in maintenance for image forming apparatus, a maintenance control system is in progress in which a host provided at a service station where servicemen are waiting and each of a plurality of image forming apparatus provided at each user are connected in an on-line manner.

In the present specification, maintenance means whole activity for keeping operational conditions (hereinafter, referred to as "condition") of an image forming apparatus normal, including work (field work) by a serviceman at a user such as periodic checking and repair of troubles (fails and bad conditions) and activities for supporting the field work, that is, totalization and analysis of conditions of trouble occurrence and improvements in the working manual.

In a maintenance control system, controlled items are mainly related to conditions of image forming apparatus, and image forming apparatus have a function of transmitting condition data corresponding to conditions indicated by an output signal of a sensor in each portion to a host.

By controlling conditions of each image forming apparatus at the service station, if a trouble occurs, a serviceman can estimate contents of the trouble with the condition data and make a visit to a user with prepared necessary repairing parts.

On the other hand, conventionally, a serviceman manually writes contents of his work in a maintenance control sheet at the end of the field work. The written items expressing contents of the work include a name of the serviceman, work time, names of replaced parts if any, portions to which adjustment or cleaning is applied.

The maintenance control sheet, in addition to be used as a bill for a demand for the work charge, is kept at the service station to be utilized for record of measures taken according to conditions of an image forming apparatus, that is, history information of maintenance for the image forming apparatus. For example, in the next field work, the work time can be reduced by confirming parts recently replaced referring to the maintenance control sheet to omit adjustment and checking for the parts.

Conventionally, however, recording in the maintenance control sheet took a large amount of time and labor, so that there has been a problem of a great burden for the serviceman. Especially, if more detailed records of work contents are required, for example, information of how adjustment was made together with where the adjustment was made, a burden of the serviceman further increases. Accordingly, actually, the written items can not be increased so much. Therefore, it is difficult to obtain more detailed history information.

Also, when the information written in the maintenance control sheet is managed by the host at the service station, there has been a problem that it was difficult to obtain history information with high reliability because input mistakes might be made in the input process for inputting the information from the maintenance control sheet to the host.

Generally, in order to enhance work efficiency in the field work in maintenance, more information related to events of the field work, or so-called field information (market information) is preferably utilized. That is to say, if information indicating measures taken by a large number of servicemen are collected to accumulate guide information instructing effective measures for various kinds of conditions (information indicating work procedure), a serviceman can reduce his work time by utilizing the guide information.

As described above, however, the maintenance control system controlling only conditions of each image forming apparatus had a problem that the field work by the serviceman can not be made efficient by utilizing the field information.

SUMMARY OF THE INVENTION

It is an object of the present invention to perform maintenance control effectively in image forming apparatus.

It is another object of the present invention to reduce a burden of a serviceman performing maintenance in image forming apparatus.

It is still another object of the present invention to enable accumulation of history information with high reliability related to maintenance control in image forming apparatus.

It is yet another object of the present invention to implement efficient field work by a serviceman utilizing history information in image forming apparatus.

It is still another object of the present invention to quickly and precisely perform calculation of a charge for the field work in image forming apparatus.

In order to achieve the above objects, an image forming apparatus according to one aspect of the present invention is an image forming apparatus connectable to an external control unit through a communication line, including detecting means for detecting contents of maintenance work applied to the image forming apparatus, storing means for storing work data indicating the detected result by the detecting means, and transmitting means for transmitting through the communication line the work data stored in the storing means to the control unit.

In an image forming apparatus configured as described above, the maintenance of an image forming apparatus can be effectively controlled because the work data related to the maintenance work is transmitted to the control unit.

In order to achieve the above objects, an image forming apparatus according to another aspect of the present invention is a control system of image forming apparatus including a plurality of image forming apparatus and a control unit connected to each of the image forming apparatus through a communication line, wherein each of the image forming apparatus includes image forming means for forming an image on paper, guidance information receiving means for receiving guidance information for instructing a procedure of maintenance work, outputting means for outputting the guidance information received by the guidance information receiving means as a visible image, and work data transmitting means for transmitting work data related to the maintenance work to the control unit through the communication line, and the control unit includes storing means for storing the guidance information, guidance information transmitting means for transmitting the guidance information stored in the storing means to the image forming apparatus through the communication line, work data receiving means for receiving the work data transmitted from the image forming apparatus, and means for updating the guidance information stored in the storing means on the basis of the data received by the work data receiving means.

In a control system of image forming apparatus configured as described above, guidance information stored in a control unit is updated on the basis of work data transmitted from the image forming apparatus, and the updated guidance information is transmitted to the image forming apparatus, so that a burden of a serviceman performing maintenance is reduced to enable appropriate and quick field maintenance work.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 10A-10C are diagrams showing specific displayed contents of a display portion of the copying machine of FIG. 1.

FIG. 11 is a diagram showing specific contents of a trouble table employed for estimating a trouble cause in accordance with one embodiment of the present invention.

FIGS. 17A-17D are diagrams showing contents displayed in a display portion of the copying machine in the flow chart of FIG. 12.

DESCRIPTION OF THE PREFERRED EMBODIMENTS

Embodiments of the present invention will be described below referring to the figures.

Figure 1:
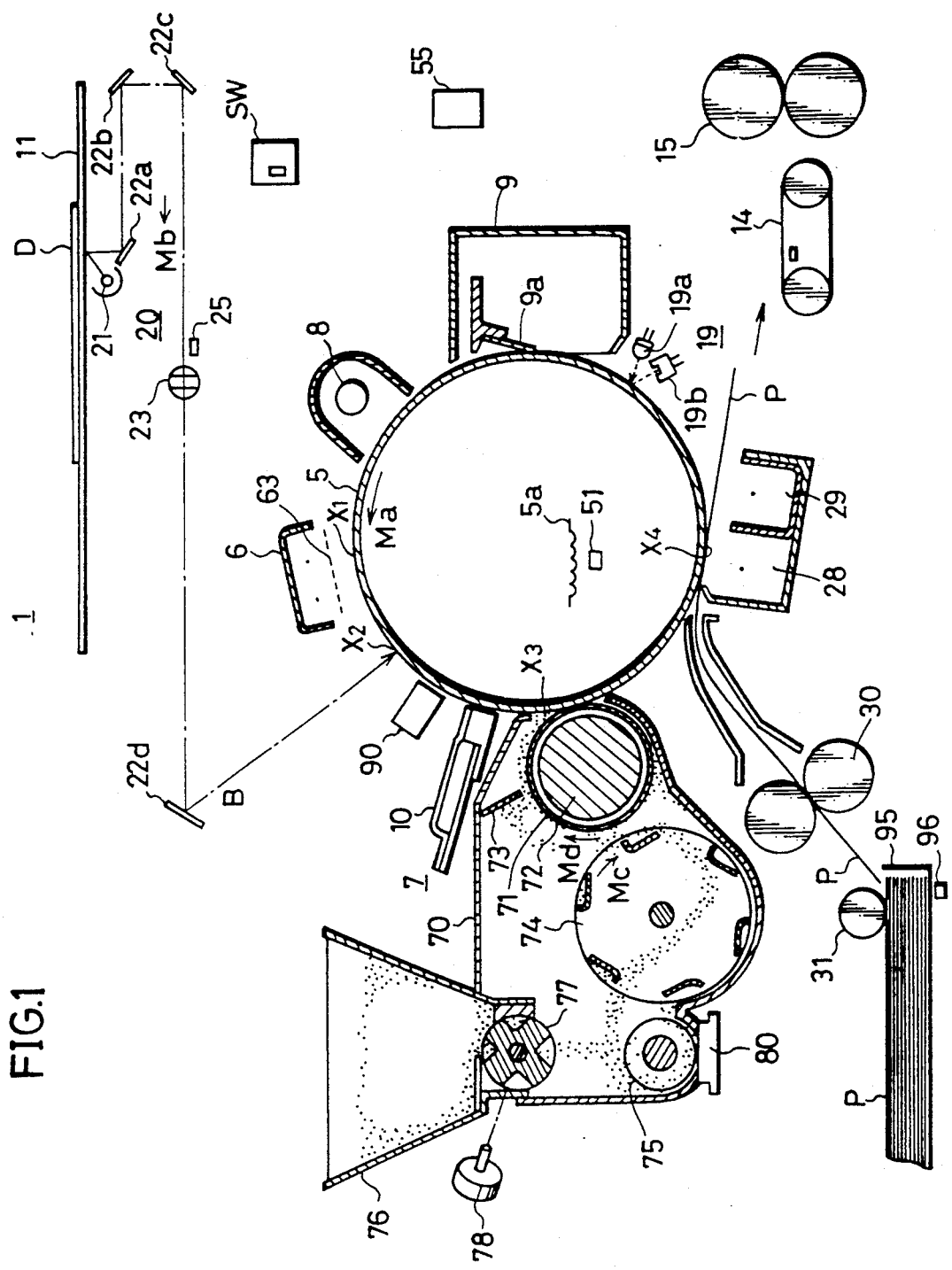
FIG. 1 is a front sectional view showing a main portion of a copying machine in accordance with one embodiment of the present invention.

FIG. 1 is a front sectional view showing a main portion of a copying machine 1.

In the figure, a photoreceptor drum 5 is provided rotatable in the direction of the arrow Ma at a constant circumferential speed v. In the drum, a heater 5a for heating photoreceptor drum 5 and a temperature sensor 51 are provided. Heater 5a is on/off controlled on the basis of an output signal of temperature sensor 51, the temperature of photoreceptor drum 5 is kept constant thereby.

Around the drum 5, for the electrophotographic process, a corona charger 6, an eraser 10 for portions between images, a developing device 7, a transfer charger 28, a copy paper separation charger 29, a cleaning device 9, and a main eraser 8 are provided. Corona charger 6 is a charger of Scorotron type having a mesh-like grid 63.

Between an exposure position X2 and eraser 10, a surface electrometer (V0 sensor) 90 for measuring a surface potential (V0) of photoreceptor drum 5 is provided. Also, between the copy paper separation charger 29 and cleaning device 9, a reflection type photosensor (AIDC sensor) 19 including an emitter element 19a and a receiving element 19b is provided for measuring the density of a reference toner image.

The surface of photoreceptor drum 5, passing under the corona charger 6, is evenly charged and exposed by an optical system 20 at the exposure position X2. By the exposure, the surface charge of photoreceptor drum 5 is partially removed and a latent image corresponding to an original D is formed on the surface of photoreceptor drum 5. The surface charge except for the portion of the latent image is eliminated by eraser 10.

The optical system 20 includes an exposure lamp 21 for irradiating the original D provided on a platen glass 11, mirrors 22a-d d for leading reflected light B from the original D to the exposure position X2 and a projecting lens 23. In the vicinity of projecting lens 23, an AE sensor 25 for sensing an amount of the reflected light from the original D is provided.

In exposure-scanning to the original D, exposure lamp 21 and mirror 22a move at a speed of v/m (m indicates a copying magnification) in the direction designated by the arrow Mb, and mirrors 22b, 22c are movable at a speed of v/2m.

The latent image formed on the surface of photoreceptor drum 5 is developed by developing device 7 to appear as a toner image.

The developing device 7 performs a so-called non-reversal development, in which a developer composed of a mixture of magnetic carrier and insulative toner is employed, and the toner sticks to a latent image (a charge existing portion, or a non-exposed portion) passing through a developing position X3 in the well known magnetic brush system. In a developer tank 70, there are a developing sleeve 71 having a magnetic roller 72 therein, a regulating plate 73, a bucket roller 74 and a screw roller 75, and a toner concentration sensor (ATDC sensor) 80 is provided below the screw roller 75.

When the bucket roller 74 rotates in the direction designated by the arrow Mc, the developer sticks to the outer peripheral surface of the developing sleeve 71 with the magnetic force of the magnetic roller 72, which is transported to the developing position X3 with the rotation of the developing sleeve 71 in the direction of the arrow Md. The toner concentration sensor 80 measures the weight percentage T/C [wt %] of the toner with respect to the entire developer based on the permeability of the developer.

A toner tank 76 is provided above developing tank 70 and a toner supply roller 77 is provided in the bottom portion thereof. With the toner supply roller 77 rotation-driven by a supply motor 78, the toner is supplied from toner tank 76 to screw roller 75. The supplied toner is stirred and mixed with the developer already existing inside the developing tank 70 with the rotation of screw roller 75 to be sent to bucket roller 74. Frictional electrification is produced in the stirring and mixing, so that the magnetic carrier and the toner are charged in different polarities. The toner of negative polarity sticks to the surface of photoreceptor drum 5 at the developing position X3 because of electrostatic adsorption with the surface charge of photoreceptor drum 5. Then, in order to prevent the toner from sticking because of the residual charge (charge remaining in the exposed portion) on the surface of photoreceptor drum 5, developing bias VB of a predetermined voltage is applied to developing sleeve 71.

On the other hand, paper P is fed one by one from detachable paper feed cassette 95 by paper feed roller 31, transported while keeping timing with rotation of photoreceptor drum 5 by timing roller 30 to a transfer position X4 where a toner image is transferred to the paper P by transfer charger 28. The paper P on which the toner image is transferred is separated from photoreceptor drum 5 by copy paper separation charger 29, transported to fixing device 15 by transporting belt 14, and discharged out of copying machine 1 after fixing of a toner image.

Subsequently, on the surface of photoreceptor drum 5, remaining toners are removed by a cleaning blade 9a of a cleaning device 9 and the residual charge is removed by main eraser 8 for the next exposure. The light amount of main eraser 8 is controlled constant on the basis of an output of a light amount sensor (not shown).

A paper sensor 96 including a photosensor detecting absence/presence of paper P is provided in paper feed cassette 95. Replacement detecting portion 40 for detecting presence/absence of replacement of each device (part) is provided in each mounting portion of photoreceptor drum 5, developing device 7, fixing control portion 55 drive-controlling fixing device 15 and so forth.

Figure 2:
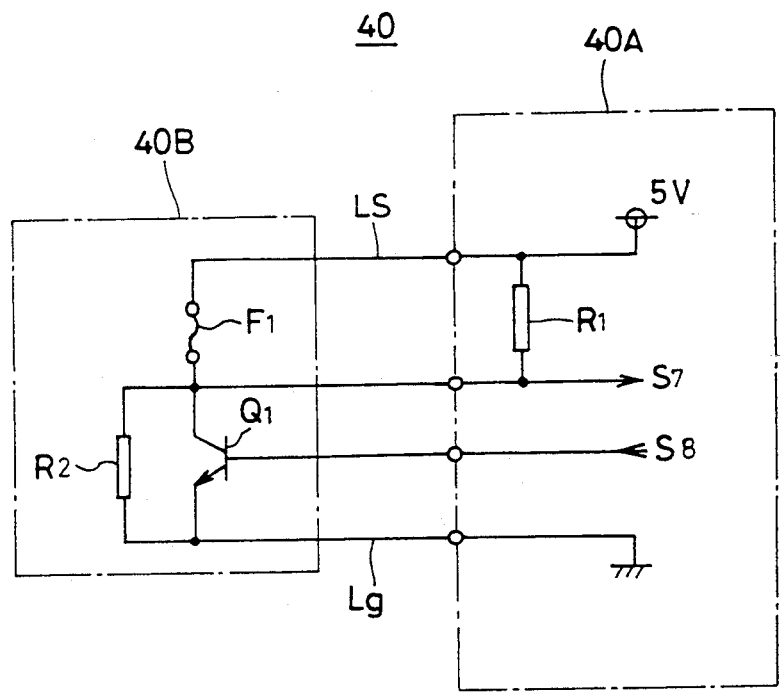
FIG. 2 is a circuit diagram showing a configuration of a replacement detecting portion in accordance with the embodiment of the present invention.

FIG. 2 is a circuit diagram showing a configuration of replacement detecting portion 40.

The replacement detecting portion 40 includes a fuse F1, a transistor Q1 of NPN type, and a resistor R2 provided on the parts side 40B, and a resistor R1 provided on the main body side 40A of copying machine 1, having fuse F1 and a collector.emitter line of transistor Q1 connected in series between a power source line Ls and a ground line Lg, and resistors R1 and R2 each connected in parallel with respect to fuse F1 and the collector.emitter line. The resistance value of resistor R2 is smaller than that of resistor R1.

In replacement detecting portion 40, fuse F1 is in a conductive state at the point of newly mounting the part. That is to say, immediately after replacement, the value of a signal S7 indicating a connecting point potential of fuse F1 and the collector of transistor Q1 is at a power source voltage (5 volt). Subsequently, in an automatic extracting process of replaced parts which will be described later, a signal S8 turning on transistor Q1 is momentarily applied to the base of transistor Q1. Thus, fuse F1 is cut off, and the value of the signal S7 attains a terminal voltage of resistor R2 (approximately 0 volt). That is, with existence/absence of change of a value of the signal S7 upon application of signal S8, it can be detected whether the part is newly mounted or not.

Figure 3:
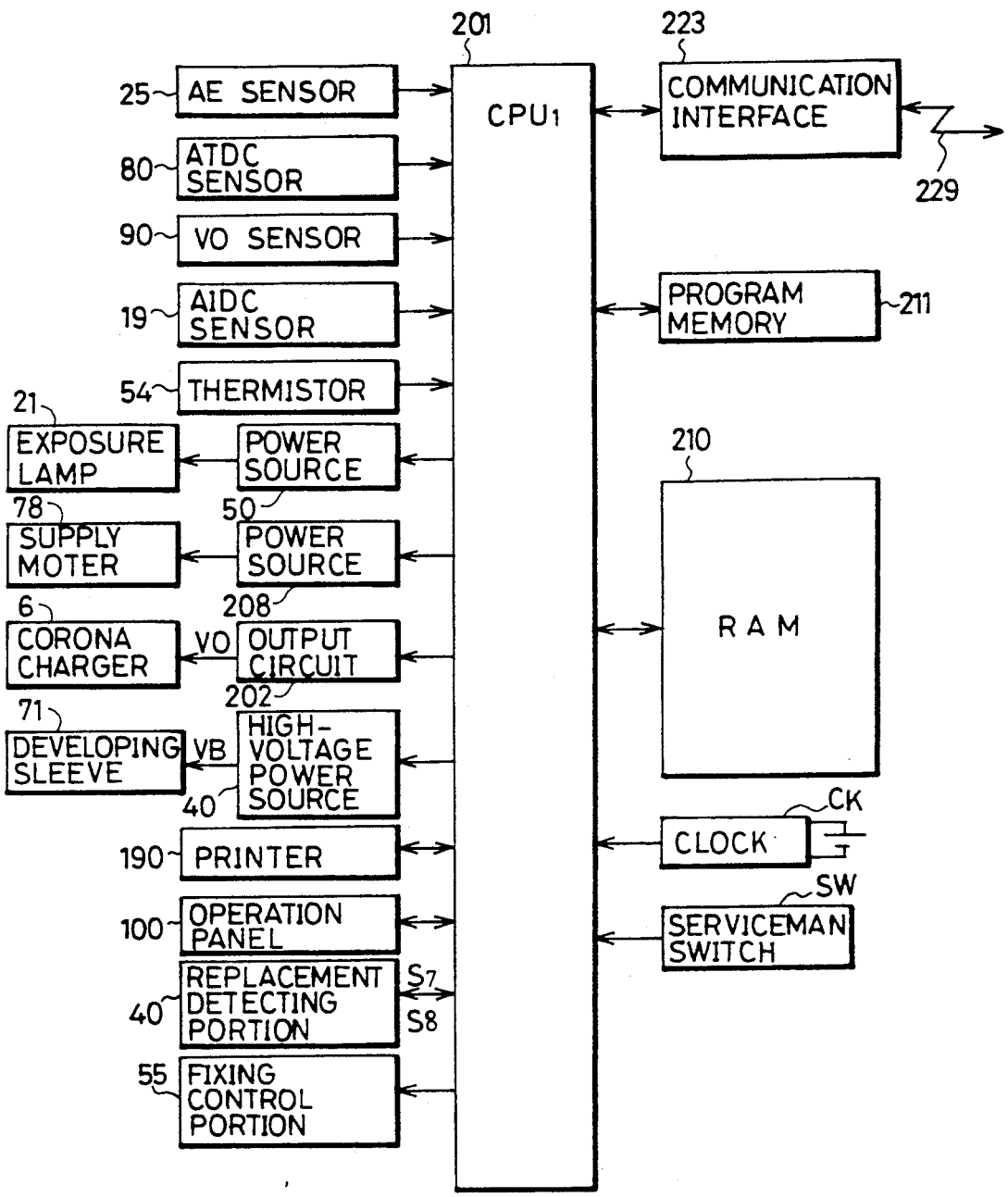
FIG. 3 is a block diagram showing a configuration of a control circuit of the copying machine of FIG. 1.

FIG. 3 is a block diagram of a control circuit 200 of the copying machine 1 of FIG. 1.

Control circuit 200 includes a CPU 201 totally controlling copying machine 1, a program memory 211 in which a control program is stored, a writable/readable memory (RAM) 210 for various kinds of data employed for control of the electrophotographic process and control of copying machine 1 and so forth, and a communication interface 223 for communicating with control unit 2 described later.

The data stored in memory 210 include reference data BD which is a reference for controlling the electrophotographic process, condition data CD which shows the past and the present conditions including information of set values in each portion such as a light amount of exposure lamp 21, an output voltage of corona charger 6, a bias voltage applied to developing sleeve 71 appropriately changed in control, information of installation circumstances such as temperature and humidity, and information of detected values such as a surface potential (Vo) of a photoreceptor and image density measured by AIDC sensor 19, and the user data UD related to operational control of a user such as the accumulated number of copies and consumed amount of consumable products, and work data WD indicating contents of maintenance work by a serviceman.

To CPU 201, signals from each portion such as the above-described AE sensor 25, ATDC sensor 80, V0 sensor 90, AIDC sensor 19, a clock CK counting the time, and the above-described replacement detecting portion 40 are supplied. The CPU 201 supplies control signals to exposure lamp power source 50 for lightening exposure lamp 21, power source 208 for driving supply motor 78, output circuit 202 for setting a surface potential V0 of photoreceptor drum 5, high voltage power source 40 for applying developing bias VB, fixing control portion 55, replacement detecting portion 40 and so forth.

The control program PR includes a main control program for controlling operation directly connected with image forming and a sub control program for controlling data processing related to program change, but the control program PR will be described as the main control program hereinafter.

The program memory 211, into which the control program PR can be written, includes a nonvolatile storage device maintaining storage conditions of the control program PR which is backed-up by a cell or the like even after the power source of the copying machine 1 is turned off.

The CPU 201, in addition to controlling the photoelectric process, receives the control program PR transmitted from control unit 2 for controlling the data processing for storage into program memory 211.

The CPU 201 also controls communication of transmitting the data of memory 210 to external devices in response to commands from external devices. The abovedescribed replacement detecting portion 40 provided in each portion, operation panel 100 and small size printer 190 are also connected to CPU 201.

Furthermore, CPU 201 counts the number of printing by copying machine 1, the number of pieces of consumed paper of each size, the number of toner supply and so on, which are stored in RAM 210 as operation data OD.

A modem for data communication employing telephone line 230 is incorporated in communication interface 223. The communication interface 223 is arranged as an additional device outside the main body of copying machine 1, driving power of which is supplied from copying machine 1.

Figure 4:
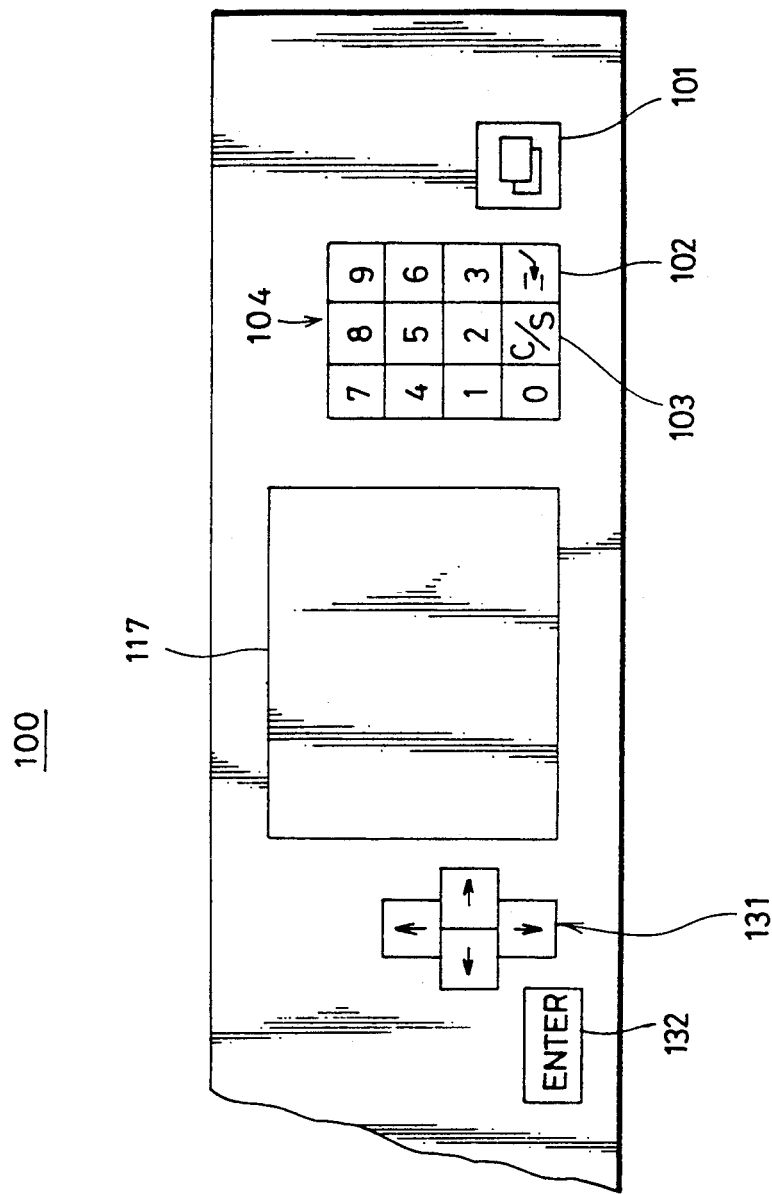
FIG. 4 is a plan view showing a part of an operation panel of the copying machine of FIG. 1.

FIG. 4 is a plan view showing a portion of operation panel 100 of the copying machine 1 of FIG. 1.

Operation panel 100 includes a print key 101 for starting copying operation, a group of ten keys 104 having keys corresponding to each numeral, 1, 2, ... 9, 0, an interruption key 102, a clear.stop key 103 for releasing setting of copying conditions, a message display portion 117 composed of a liquid crystal display, cursor keys 131 and an ENTER key 132.

In the message display (may be referred to as "a display") 117, selection displays such as of copying conditions including the number of copies and copying magnification, and various kinds of copying modes such as magnification/minification and duplex copy are normally made. When a mode for serviceman use only is selected upon operation of a serviceman switch SW in copying machine 1, however, the display is switched to make a selection display for maintenance work.

Cursor key 131 is for moving a cursor to a position of desired selection item on the screen of display 117. Upon push-down of ENTER key 132, a process corresponding to the selection item of the cursor position is carried out.

Figure 5:
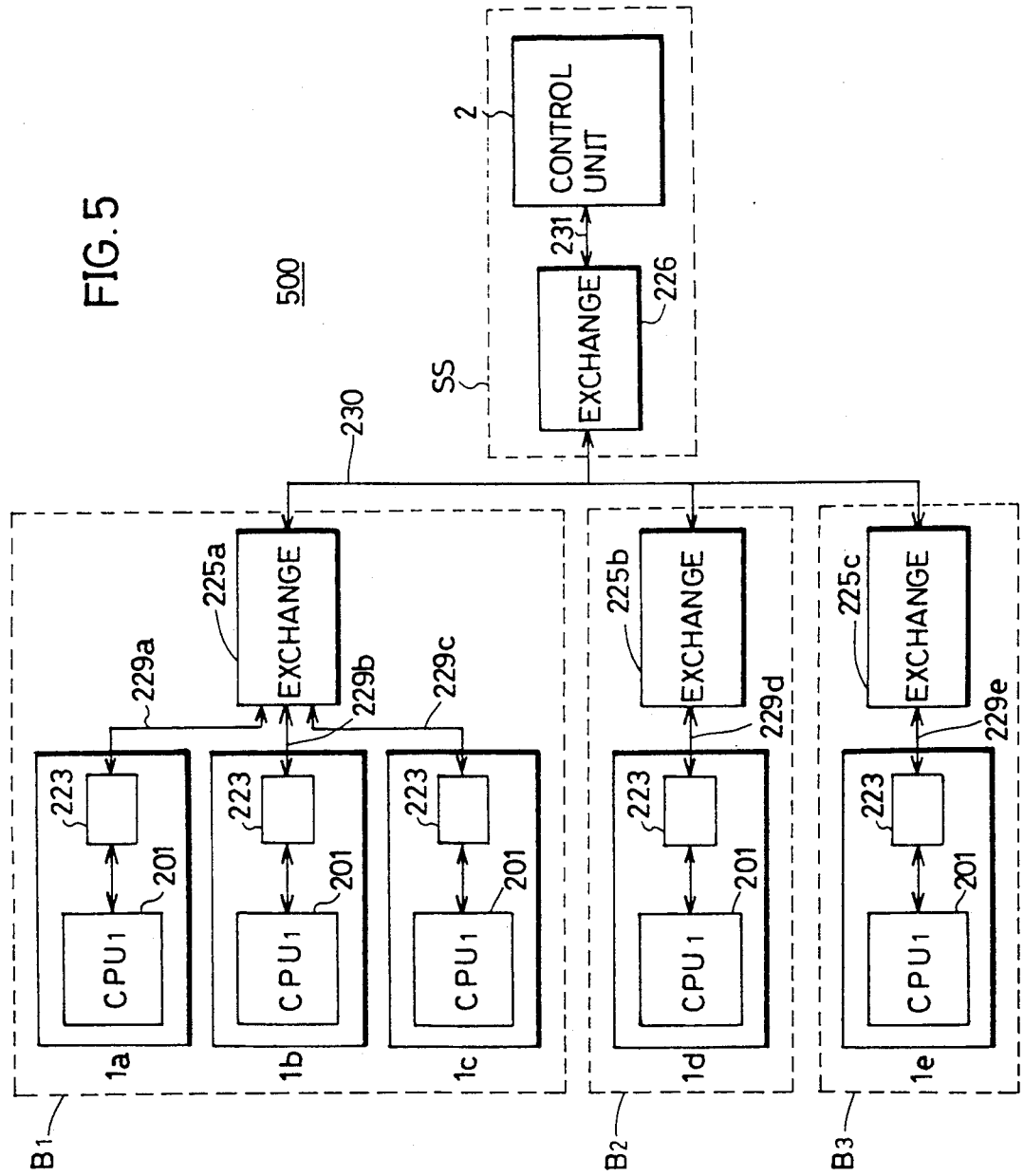
FIG. 5 is a block diagram showing a configuration of a control network system in accordance with the embodiment of the present invention.

FIG. 5 is a block diagram showing a configuration of a control network system 500.

The control network system 500 has five copying machines 1a-1e of the same type provided at a user, and a control unit 2 at a service station SS made on-line using telephone line 230, in which the copying machines 1a -1c are provided in a building B1 having interior wiring network with automatic exchange 225a and interior lines 229a-c, and the copying machines 1d and 1e are provided in buildings B2 and B3, respectively, and connected to telephone line 230 through automatic exchanges 225b and 225c.

In the description below, one which receives/transmits information from and to control unit 2 is referred to as "copying machine 1" among copying machines 1a-1e.

On the other hand, control unit 2 is connected to telephone line 230 through an exchange 226 at the service station SS and an extension 231.

Each copying machine 1a-1e and control unit 227 can also be directly connected to each other without using exchanges 225a-c, 226.

Figure 6:
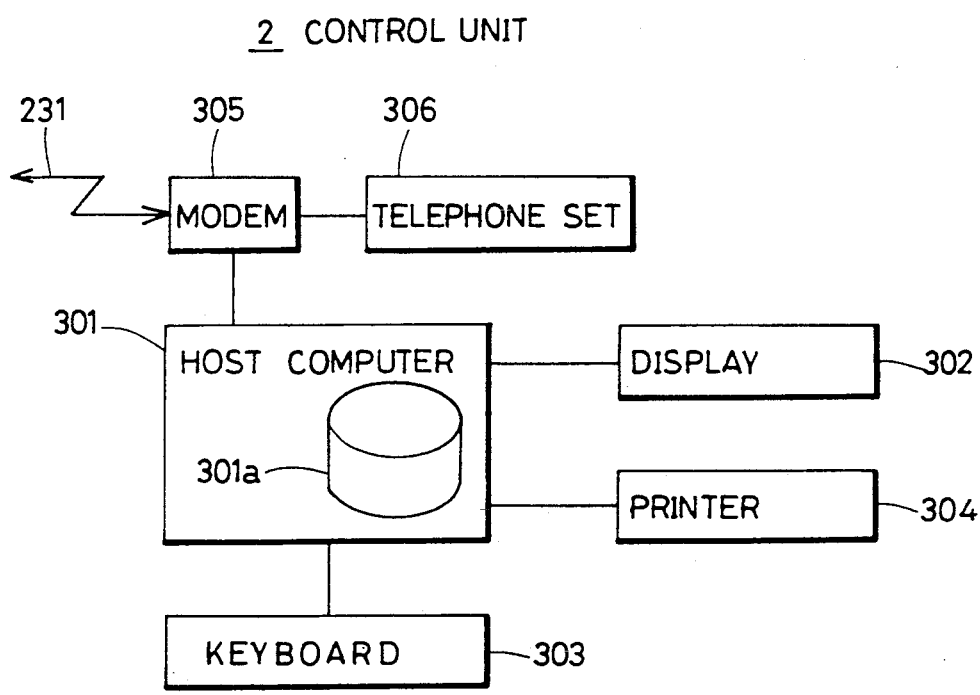
FIG. 6 is a block diagram showing a configuration of the control unit of FIG. 5.

FIG. 6 is a block diagram showing a configuration of control unit 2.

Control unit 2 includes a host computer 301 carrying out various kinds of processes according to the software, a display 302 for displaying, a keyboard 303 as operation input means, a printer 304 for printing, a modem 305 for communication with a plurality of copying machines provided at each user through telephone line 230, and a telephone set 306 for communication between a serviceman and a user. A storage device 301a for accumulating the history information MRD showing details of maintenance for respective copying machines 1a-1e, a stock table UST for dealing with the stock amount of consumable goods (toner, paper P etc.) at each copying machine, and a trouble table TT for supporting maintenance work by a serviceman is incorporated in host computer 301.

Figure 7:
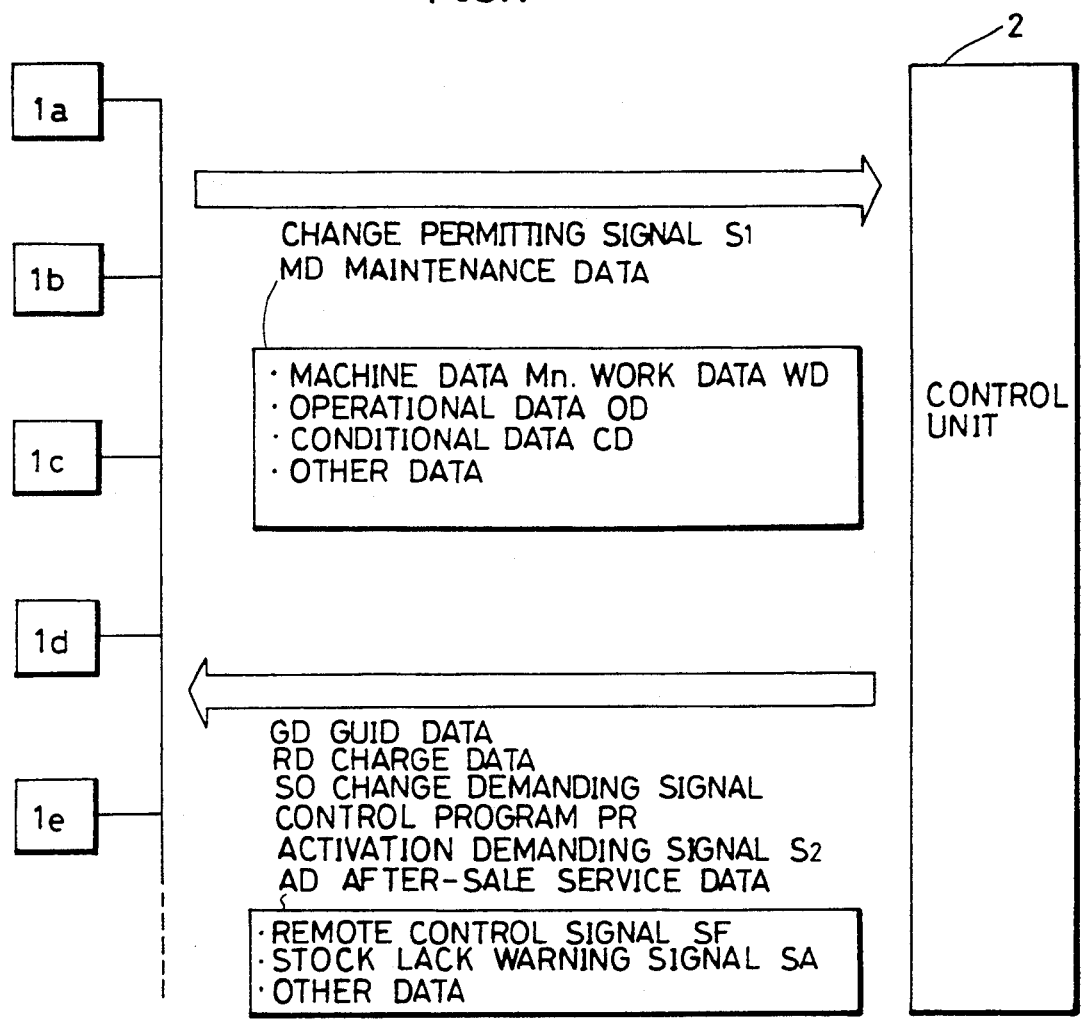
FIG. 7 is a diagram showing contents of communication of the control network system of FIG. 5.

FIG. 7 is a diagram showing contents of communication in the control network system 500 of FIG. 5.

Each of copying machines 1a-1e transmits the maintenance data MD at an appropriate time (for example, upon turning on of a power source or a predetermined time).

The maintenance data MD includes a machine number Mn for specifying any of copying machines 1a-1e, operation data OD showing conditions of use of consumable goods, condition data CD showing conditions and work data WD showing contents of maintenance work by a serviceman.

The work data WD includes above-described condition data, complementary condition data HCD corresponding to information related to conditions the serviceman himself found out with his sense, and implemented items actually carried out by the serviceman (for example, adjusted portions, cleaned portions, replaced parts and so forth). The serviceman can read a copied image using an image reader to use the image data as a part of the complementary condition data HCD.

On the other hand, as will be described later, the host computer 301 of control unit 2, on the basis of the maintenance data MD transmitted from each copying machine 1a–1e, carries out an automatic diagnosis process for detecting conditions of each copying machine 1a–1e and a stock management process for preventing lack of stock of consumable goods at each user, and transmits after-sale service data AD including a remote control signal SF and a stock lack warning signal SA to the particular one of copying machines 1a–1e.

The control unit 2 transmits the guide data GD for informing the serviceman of the work procedure appropriate for conditions of copying machine 1 to the objective copying machine 1 for maintenance.

Thus, in copying machine 1, with a guidance message displayed in display 117 on the basis of the guide data D, the serviceman proceeds his work following the message to quickly and appropriately perform checking or repair of troubles.

The work data WD transmitted to control unit 2 is stored in storage device 301a in host computer 301 together with the work data WD corresponding to each of other copying machines 1a–1e collected in the same way, and accumulated as the history information MRD corresponding to each copying machine or the field information FD.

Accordingly, as compared to off-line information collection in which, for example, a serviceman writes contents of his work in a service management sheet and brings it back to the service station SS, the history information MRD and the field information FD have enhanced reliability and can be accumulated more easily.

The host computer 301, on the basis of the field information FD, sequentially carries out data processing processes such as a totalization process of frequency of trouble occurrence and an analyzing process for implemented items effective as measures for troubles, to produce new guide data GD for enhancing efficiency in maintenance. That is, every time information showing contents of field work is added to the field information FD, the guide data GD is updated in consideration of the new information in order to improve procedures of the field work.

The host computer 301 also, in the field work, carries out an extracting process of the guide data GD corresponding to the condition of copying machine 1 indicated by the condition data CD and the complementary condition data HCD transmitted from copying machine 1, that is, a trouble diagnosis process, and transmits the guide data GD in accordance with the diagnosis result to copying machine 1 for real time support for the serviceman.

In producing the guide data GD, it is possible to take the work data WD as external events for trouble diagnosis in the field of the artificial intelligence and utilize it for estimating a cause of a trouble.

Furthermore, the host computer 301 calculates on the basis of the work data WD the work charge by synthesizing charges determined for each implemented item or the work time, prices of replaced parts, discount ratio determined for each user and so forth, and transmits the charge data RD indicating the calculated result to the particular copying machine 1.

In copying machine 1, on the basis of the transmitted charge data RD, as shown in FIG. 17D, while the work charge is displayed in display 117, the implemented items and the work charge are printed out by printer 190 as needed.

In this way, the serviceman can omit the burden of calculating a work charge and also can show the user a precise work charge.

In the control network system 500, an exchange demand signal S0 is transmitted from control unit 2 to a copying machine 1, among copying machines 1a–1e, which requires program exchange for version up, adaptation to installation circumstances, or for satisfying user's demand and so forth.

Copying machine 1, upon reception of an exchange demand signal S0, waiting for a condition where the program exchange is possible after completion of copying operation or the like, transmits an exchange permitting signal S1 to control unit 2 and also forbids starting operation thereafter.

Control unit 2 transmits a new control program PR to copying machine 1 upon receiving the exchange permitting signal S1. The transmitted new control program PR is received by copying machine 1 and sequentially stored in program memory 211.

Then, upon completion of transmitting the control program PR, control unit 2 successively transmits an activation demand signal S2.

Thus, in copying machine 1, operation is controlled according to the new control program PR.

Next, as a specific example, the field work by a serviceman for a trouble occurrence related to fixing device 15 will be described.

Figure 8A:
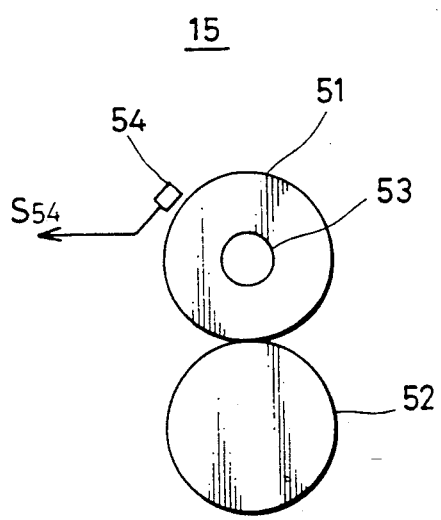
FIG. 8A is a diagram showing a configuration of a fixing device in accordance with one embodiment of the present invention.
Figure 8B:
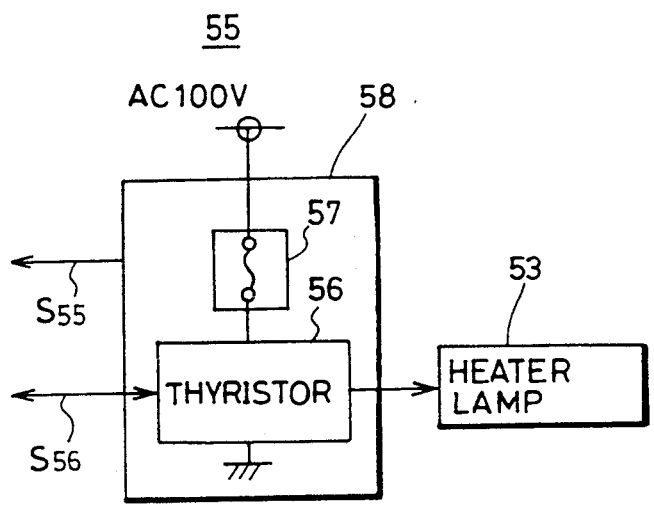
FIG. 8B is a circuit diagram related to operation of a heater lamp of the fixing device shown in FIG. 8A.

FIGS. 8A and 8B are diagrams showing a configuration of fixing device 15.

Fixing device 15 includes a heating roller 51 having a heater lamp 53 provided therein, a pressuring roller 52 for pressuring paper P, a thermistor 54 for sensing surface temperature of the heating roller 51, and a fixing control portion 55. Fixing control portion 55 includes a thyristor 56 as a switching element and a braker 57 packaged in a substrate 58.

An output signal S54 of thermistor 54 is supplied to CPU 201, and a control signal S56 is supplied to the thyristor 56 from CPU 201 according to the signal S54. In this way, supply of commercial alternating power to heater lamp 53 is controlled to keep the heating roller 51 at a predetermined temperature.

Braker 57 is a safety device of non-return type cutting off power supply to heater lamp 53 when the circumferential temperature of heating roller 51 is abnormally high.

Figure 9:
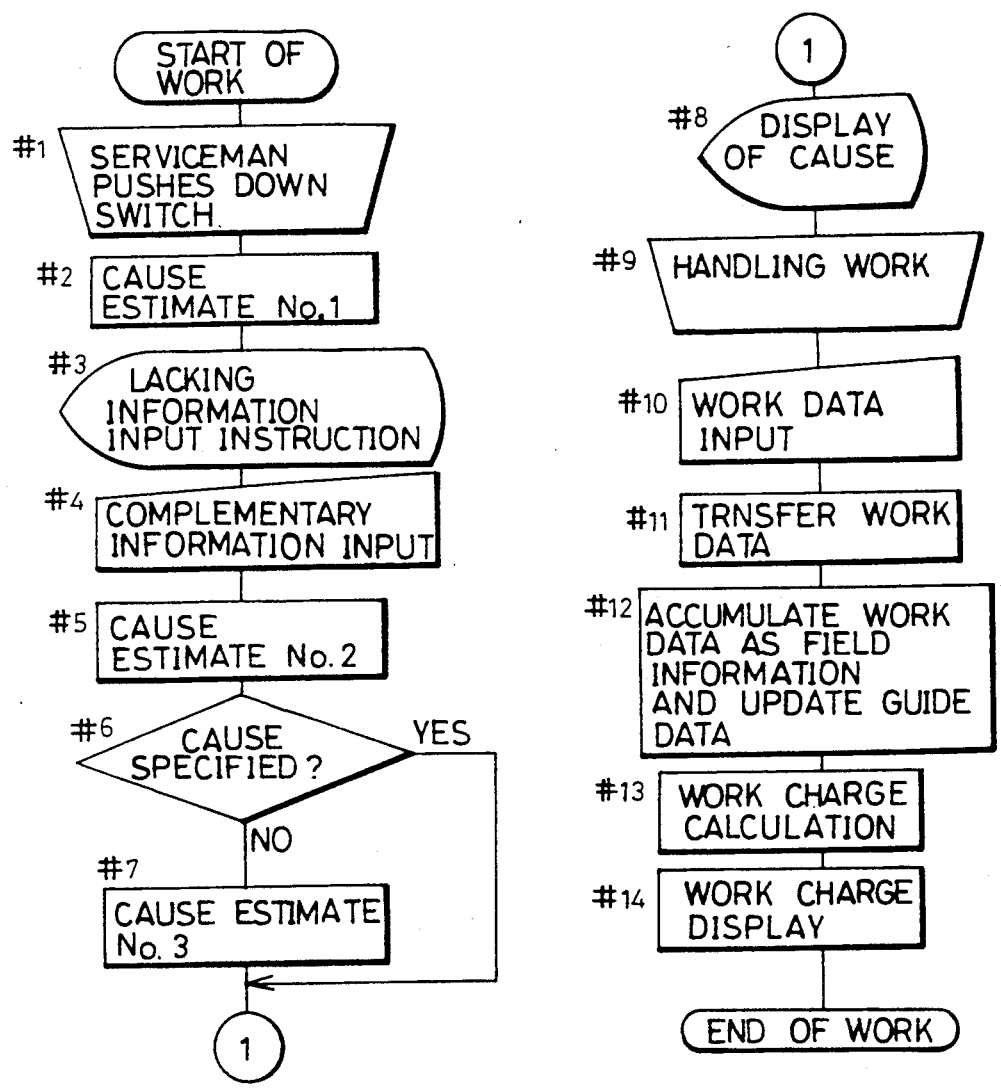
FIG. 9 is a flow chart diagram about maintenance work on the copying machine side in accordance with one embodiment of the present invention.

FIG. 9 is a flow chart diagram showing field work by a serviceman, and FIGS. 10A–10C are diagrams showing examples of display of message display 117.

In this example, the condition of the trouble is that a so-called wait for waiting for the temperature of heating roller 51 to reach a predetermined value before forming an image is not released (wait up) after a predetermined time period.

A serviceman, making a visit to a user, push down a serviceman switch first as described above to switch the display in the display 117 to a display for maintenance work (step #1). By this, the condition data CD is transmitted from copying machine 1 to control unit 2.

Control unit 2 estimates a portion where a trouble has occurred, or a cause of the trouble on the basis of the condition data CD (step #2).

In this stage, as shown in FIG. 10A, a message Z1 indicating a condition recognized by control unit 2 is displayed in the display 117.

The message Z1 shows that the sensed temperature by thermistor 54 is not more than 135° C. which is not abnormally high.

Causes of the trouble estimated only according to the information that the sensed temperature by thermistor 54 is the above value include many items.

That is, in this case, the estimated cause of the trouble includes a defect in thermistor 54, contaminants in thermistor 54, damage of heater lamp 53, a defect in fixing control portion 55, inferior mounting (imperfect contact) of fixing control portion 55 and so forth.

Next, control unit 2 displays messages Z2 and Z3 demanding a serviceman for input of complementary information necessary for specifying a cause of the trouble (step #3).

The serviceman inputs the information which he obtained through visual confirmation or the like as the complementary condition data HCD using keys of operation panel 100 following the displayed contents (step #4). In the example of FIG. 10A, as the message Z3, a question is made as to whether braker 57 is normal or not, and the corresponding input is made by selection of YES or NO.

After that, in an interaction manner of displaying the next massage in response to input for the previous message, display messages Z4 and Z5 and input corresponding to the respective massages are sequentially made.

When the information obtained with the sense of the serviceman is supplied, control unit 2 estimates a cause of the trouble also referring to the newly supplied information (step #5). Then, in display 117, a message Z6 indicating that operation for estimating is being performed is displayed.

When a cause of the trouble is specified, that is, if the number of items estimated as a cause with a predetermined possibility can be narrowed down to one or two (step #6), it proceeds to step #8 to display the cause.

For example, if heater lamp 53 lights and an output of thermistor 54 varies even just a little bit according to the lightening, the cause of the trouble can be specified as contaminant of thermistor 54, so that a display for instructing cleaning of thermistor 54 is made in step #8.

If braker 57 is not normal, however, or when the power supply is cut off, a cause of the trouble can not be specified. In this case, a cause is estimated on the basis of a trouble table TT showing handling methods corresponding to the past conditions of trouble occurrence in the market included in the guide data GD (step #7).

FIG. 11 is a diagram showing contents of the trouble table TT.

The trouble table TT includes information of an occurrence frequency for each item pointed out as a cause of a trouble, a measure corresponding to each item and possibility that each item is a real cause. In the example of FIG. 11, if the occurrence frequency of troubles caused by a defective thermistor, contaminant of a thermistor and a defective fixing control portion 55 are 1%, 2% and 6%, respectively, since the occurrence frequency of a defective fixing control portion 55 is high as compared to the occurrence frequencies of troubles caused by a defect or contaminants of thermistor 54 which are pointed out as causes of the present trouble, the cause of the present trouble can be specified as a defect of fixing control portion 55. In this case, however, it is specified only based on a statistical estimate.

Accordingly, if the cause is estimated on the basis of the trouble table TT, it is displayed that the cause is specified with not high accuracy in display 117 as shown in FIG. 10B, and instructions of work according to that are displayed.

The serviceman works on the basis of display in display 117 (step #9), and after confirmation of repair of the trouble at the end of the work, operates keys for inputting the work data WD (step #10).

If the serviceman selects a work content input mode, a message Z21 for confirmation as to whether the implemented items estimated according to the above trouble diagnosis have been actually practiced or not in display 117 as shown in FIG. 10C.

The serviceman performs selecting operation of YES or NO employing cursor key 131 and enter key 132 with respect to the displayed each implemented item.

If YES is selected, the implemented items are inputted as the work data WD indicating a part of the work contents.

In this way, input of work contents is performed in a confirmation operation system, so that the operation is easier than the method in which a predetermined code for each implemented item is sequentially supplied, with the result that mistakes and oversights are not made in input.

Also, a message Z22 instructing input of implemented items according to a decision by the serviceman himself is displayed in the display 117. In the example of FIG. 10C, selection of large items of "parts replacement", "cleaning" and "end of work" is instructed. If "parts replacement" or "cleaning" is selected, the display switches to a corresponding one. If there is no item to be inputted, "end of work" is selected.

The supplied work data WD is transmitted from copying machine 1 to control unit 2 (step #11).

Control unit 2 stores the transmitted work data WD as the field information FD, and updates the guide data GD to utilize the new field information FD (step #12).

A serviceman code, a work time or the like are supplied as inputs employing the group of ten keys 104. With respect to parts of which attachment/detachment is reported to CPU 201 such as fixing control portion 55, data indicating parts replacement is automatically supplied as work data WD from copying machine 1 to control unit 2. Subsequently, control unit 2 calculates the work charge (step #13) and display it in the display of copying machine 1 (step #14).

According to the above-described embodiment, a serviceman can proceed his work according to the display of message display 117, so that even a serviceman with less experience of the field work can properly find out a cause of a trouble to quickly repair the copying machine 1 into a normal condition.

In the above described embodiment, a description is made wherein the condition data CD is transmitted to control unit 2 upon switch operation by a serviceman, but the condition data CD can be transmitted to control unit 2 from copying machine 1 when a command signal is supplied from control unit 2 to copying machine 1, or at a predetermined time (for example, when a power source is turned on or at a predetermined time on an appropriate day). Also, although a cause of a trouble is estimated by control unit 2 in the above-described embodiment, the trouble table TT may be transmitted to a copying machine from a control unit, and a cause may be estimated on the copying machine side on the basis of the transmitted trouble table TT.

Figure 12:
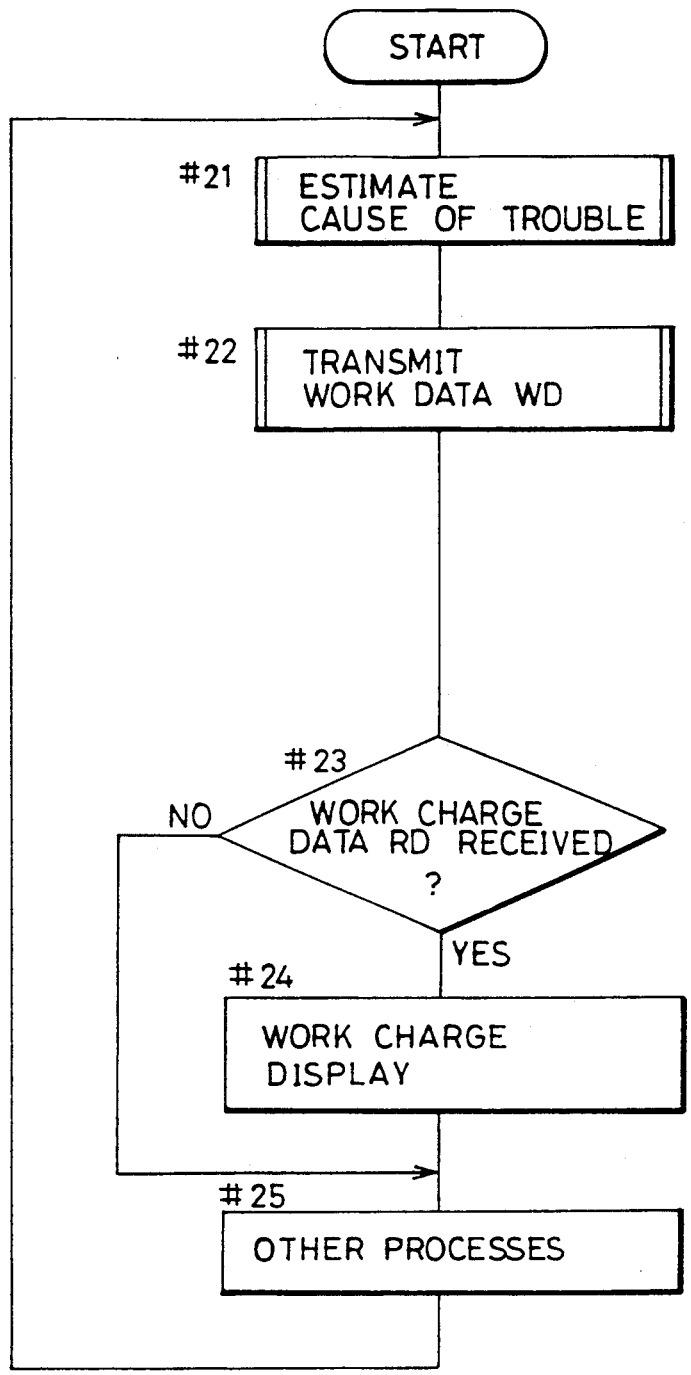
FIG. 12 is a flow chart diagram showing a control routine of a CPU 201 of the copying machine in accordance with the embodiment of the present invention.

FIG. 12 is a flow chart diagram showing operation of CPU 201.

First, in step #21, a trouble cause estimate routine is carried out. Next, the work data WD supplied by a serviceman is transmitted to the control unit. In step #23, a determination is made as to whether work charge data RD is received from a control unit or not. Upon reception of the data RD, the work charge is displayed in the display of the copying machine (step #24). After other processings in step #25, it returns to step #21.

Figure 13:
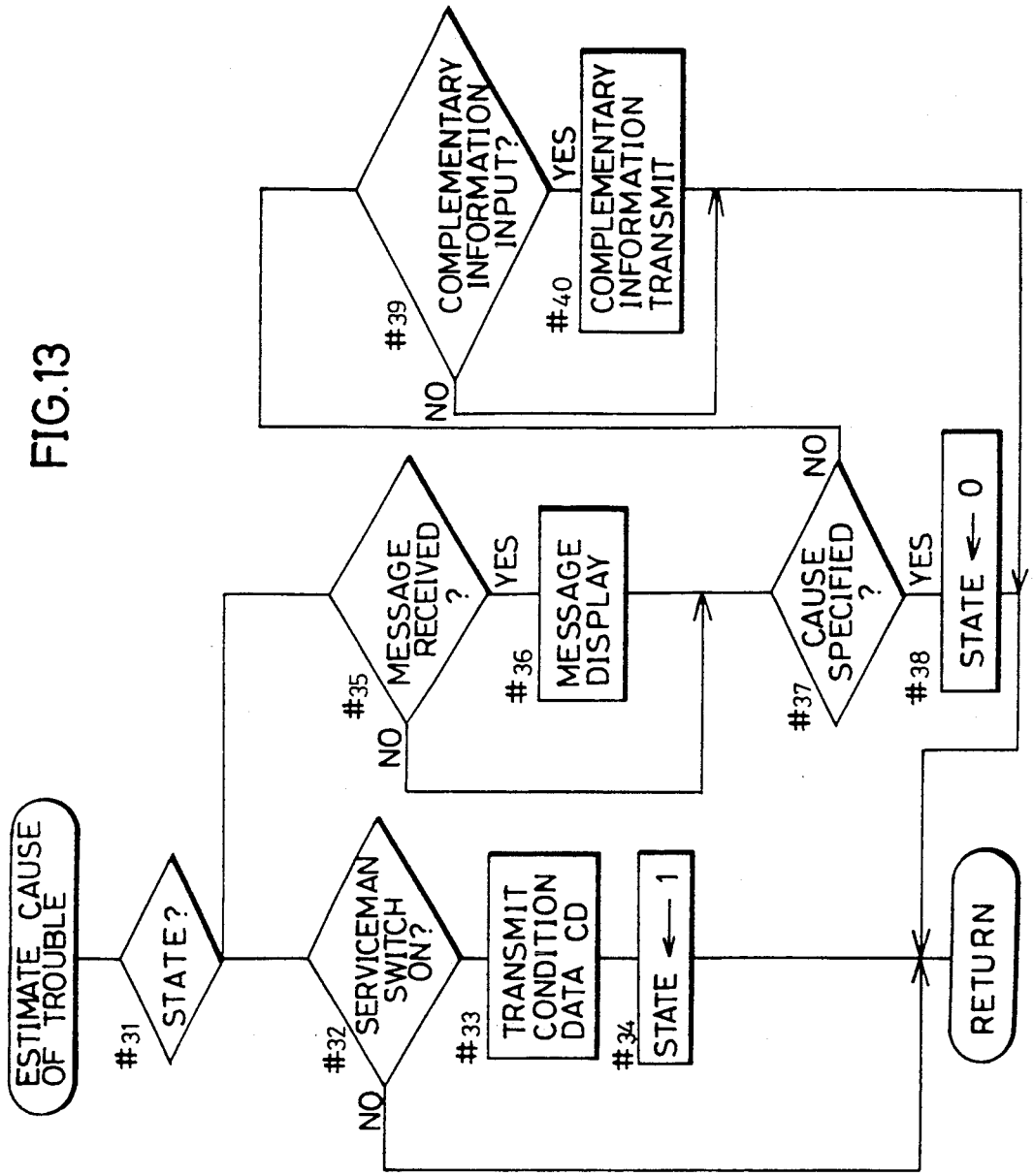
FIG. 13 is a flow chart diagram showing specific contents of the trouble cause estimate routine of FIG. 12.

FIG. 13 is a flow chart diagram showing specific contents of the trouble estimate routine of FIG. 12.

First, a state is determined in step #31. If the state is 0, a determination is made as to whether the serviceman switch is turned on or not in step #32. When the switch is ON, the condition data stored in the copying machine are transmitted to the control unit in step #33, and then the state is made 1. When the state is 1, a determination is made as to whether a message to be displayed as shown in FIG. 10A or 10B is received from control unit 2 in step #35 or not. Upon reception of the message, the contents thereof are displayed in step #36. Next, in step #37, a determination is made as to whether a cause of a trouble could be specified with the received message or not. When a cause could be specified, in step #38, the state is returned to 0 and it returns. When a cause can not be specified, in step #39, a determination is made as to whether the complementary information HCD was inputted by a serviceman from the operation panel or not. If the complementary information is inputted, in step #40, the information is transmitted to the control unit and it returns.

Figure 14:
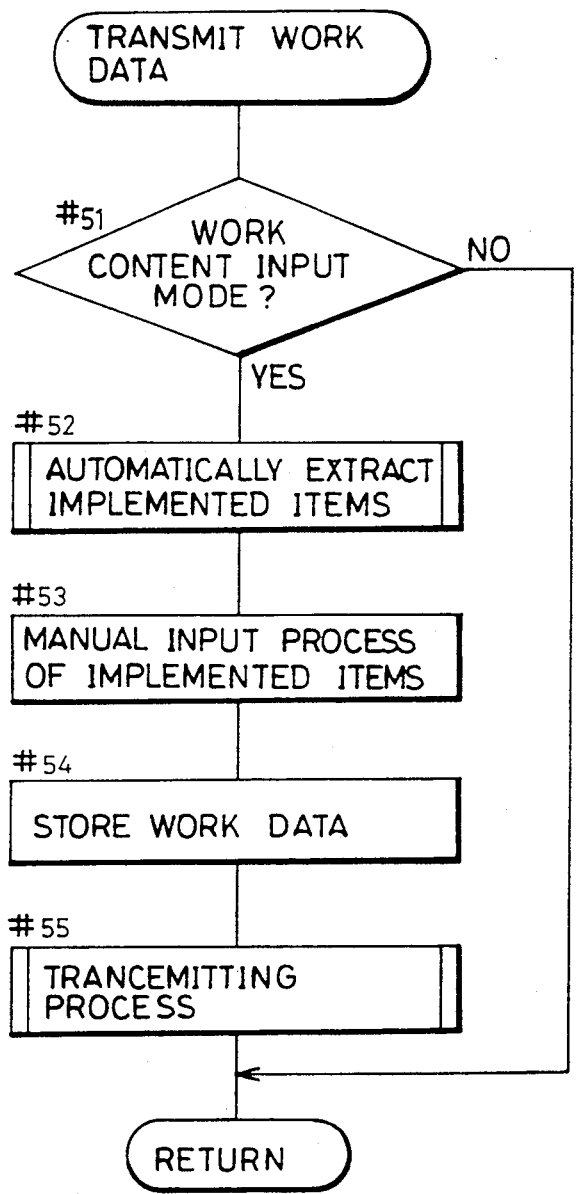
FIG. 14 is a flow chart diagram showing specific contents of a transmitting routine of the work data WD of FIG. 12.

FIG. 14 is a flow chart diagram showing specific contents of a transmission routine of the work data WD in step #22 of FIG. 12.

FIGS. 17A-17D are diagrams showing examples of displayed pictures of the message display 117.

In premaintenance or call maintenance, at the end of the treatment work corresponding to conditions for making operation of copying machine 1 normal, a serviceman selects a work content input mode on the screen of display 117.

CPU 201 checks to see if the work content input mode has been selected with operation of the operation panel or not in step #51, and if it is YES, it proceeds to step #52.

In step #52, with respect to implemented items detectable by CPU 201, the items actually performed as treatment work are automatically extracted.

Next, in step #53, a process of receiving inputs of other implemented items by a serviceman is performed.

Then, in display 117, as shown in FIG. 17A, a message Z31 showing selection of four large items of "replaced part input", "cleaned portion input", "other inputs" and "end of work", and a message Z32 instructing selection of any large item are displayed.

The serviceman makes a desired selection employing the cursor key 131 and the ENTER key 132. If there is no implemented item to be inputted, "end of work" is selected.

Then, if "replaced part input" is selected, the picture of the display 117 is switched to a picture for input of a replaced part shown in FIG. 17B.

The serviceman, with respect to implemented items of which replacement is detectable by CPU 201, following a message Z33 instructing confirmation if it was actually exchanged or not, and a message Z34 instructing input of other implemented items, sequentially performs selection operation of YES or NO about each implemented item.

As described above, since input of the work data WD is carried out with selection operation according to messages in the display, mistakes and oversights do not occur in input so that the reliability of the history information MRD is enhanced. Also, as compared to manual writing of work contents into a service management sheet, a burden of inputting work data WD is reduced to reduce a trouble of a serviceman.

In step #54, the implemented items extracted in the above-described step #52 and the implemented items in which YES was selected in step #53 are stored in memory 210 as work data WD.

Then, it returns after a transmitting process in step #55 which will be described later.

Figure 15:
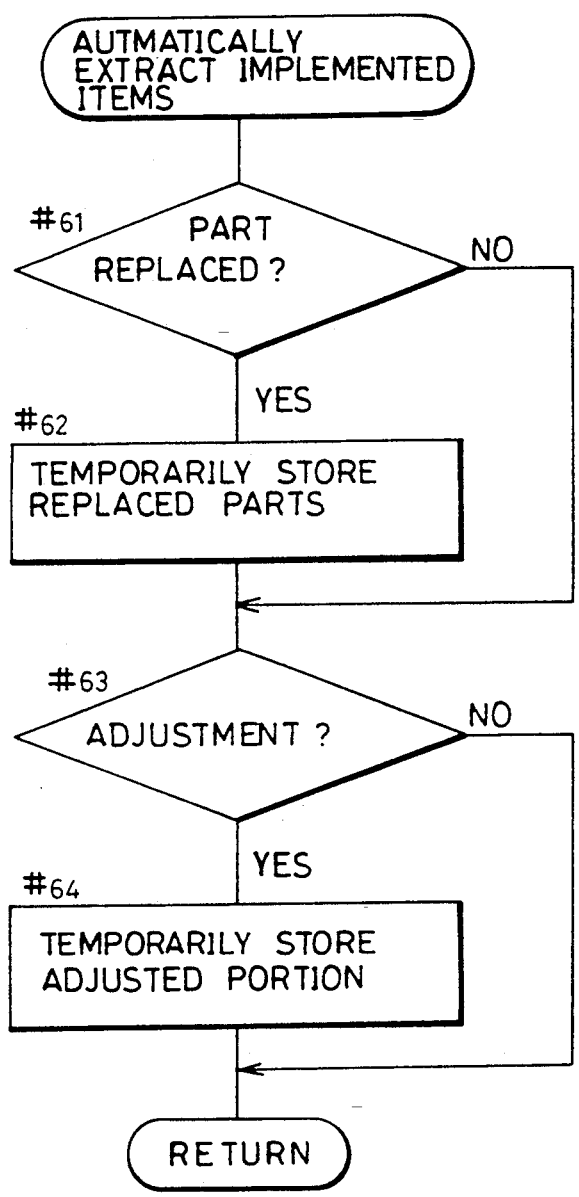
FIG. 15 is a flow chart diagram showing specific contents of an automatic extracting routine of the implemented items of FIG. 14.

FIG. 15 is a flow chart diagram of an automatic extracting process of implemented items of step #52.

First, presence/absence of implementation of parts replacement is checked with a signal S7 from replacement detecting portion 40 (step #61), if a replacement was made, the data indicating a replaced part is temporarily stored in a work area in memory 210 (step #62).

Next, by sensing conditions of a volume and a dip switch provided in respective portions, a check is made to see if adjustment was made or not (step #63). If adjustment was made, the data indicating an adjusted portion are temporarily stored in a work area in memory 210 (step #64).

Figure 16:
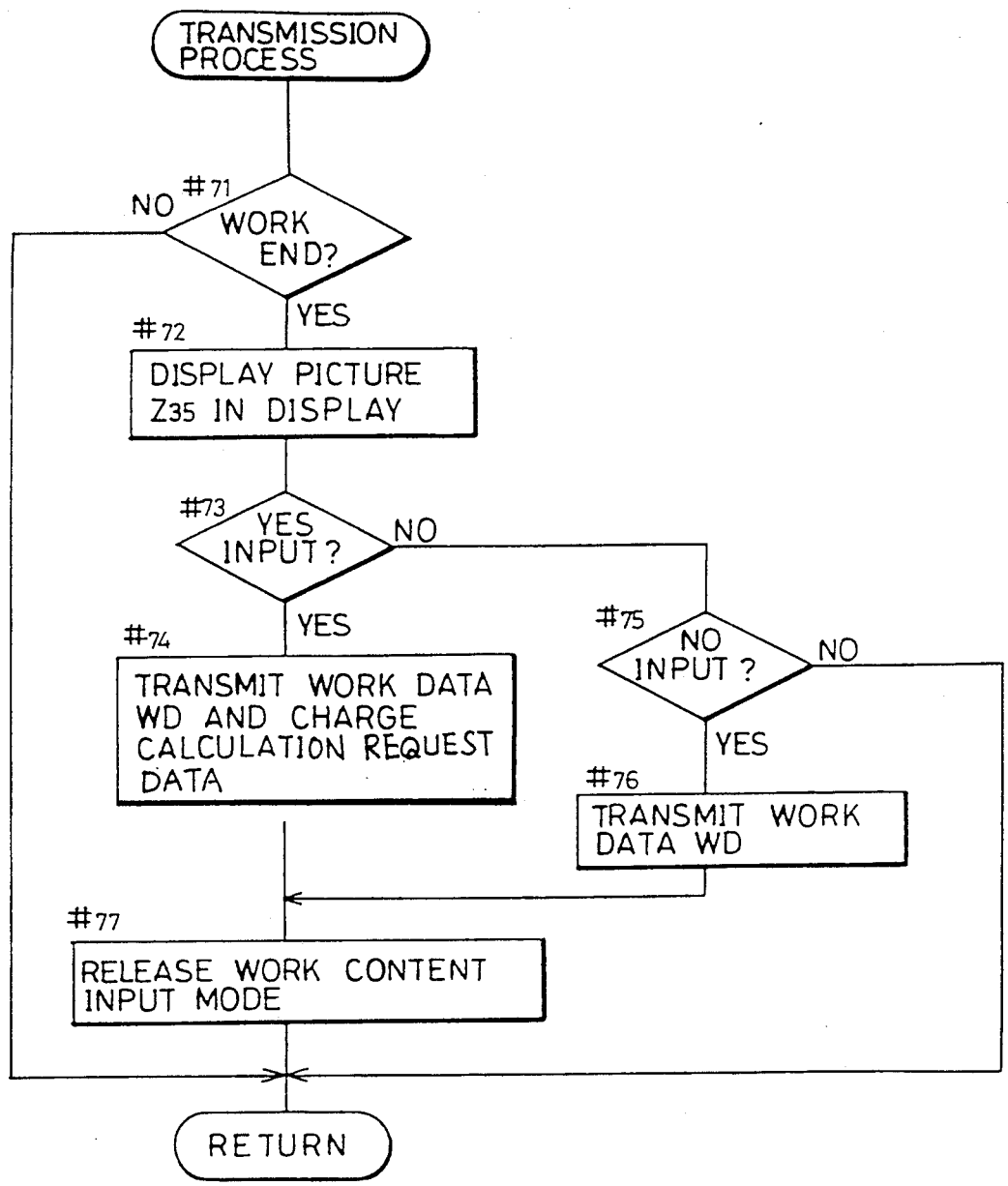
FIG. 16 is a flow chart diagram showing specific contents of the transmitting process routine of FIG. 14.

FIG. 16 is a flow chart diagram showing specific contents of the transmission process routine of step #55 of FIG. 14.

First, in step #71, a determination is made as to whether input of end of work is made using operation keys by a serviceman or not. When end of work is inputted, in step #72, as shown in FIG. 17A, the displayed contents Z35 are displayed. A determination is made as to whether YES has been inputted according to the display or not in step #73. When YES is inputted or when charge calculation is needed, in step #74, work data necessary for charge calculation and charge calculation request data are transmitted to the control unit. Then, in step #77, after releasing the work content input mode, it returns. When NO is inputted, or when charge calculation is not required (YES in step #75), in step #76, the work data WD only is transmitted to the control unit and it proceeds to step #77.

Figure 18:
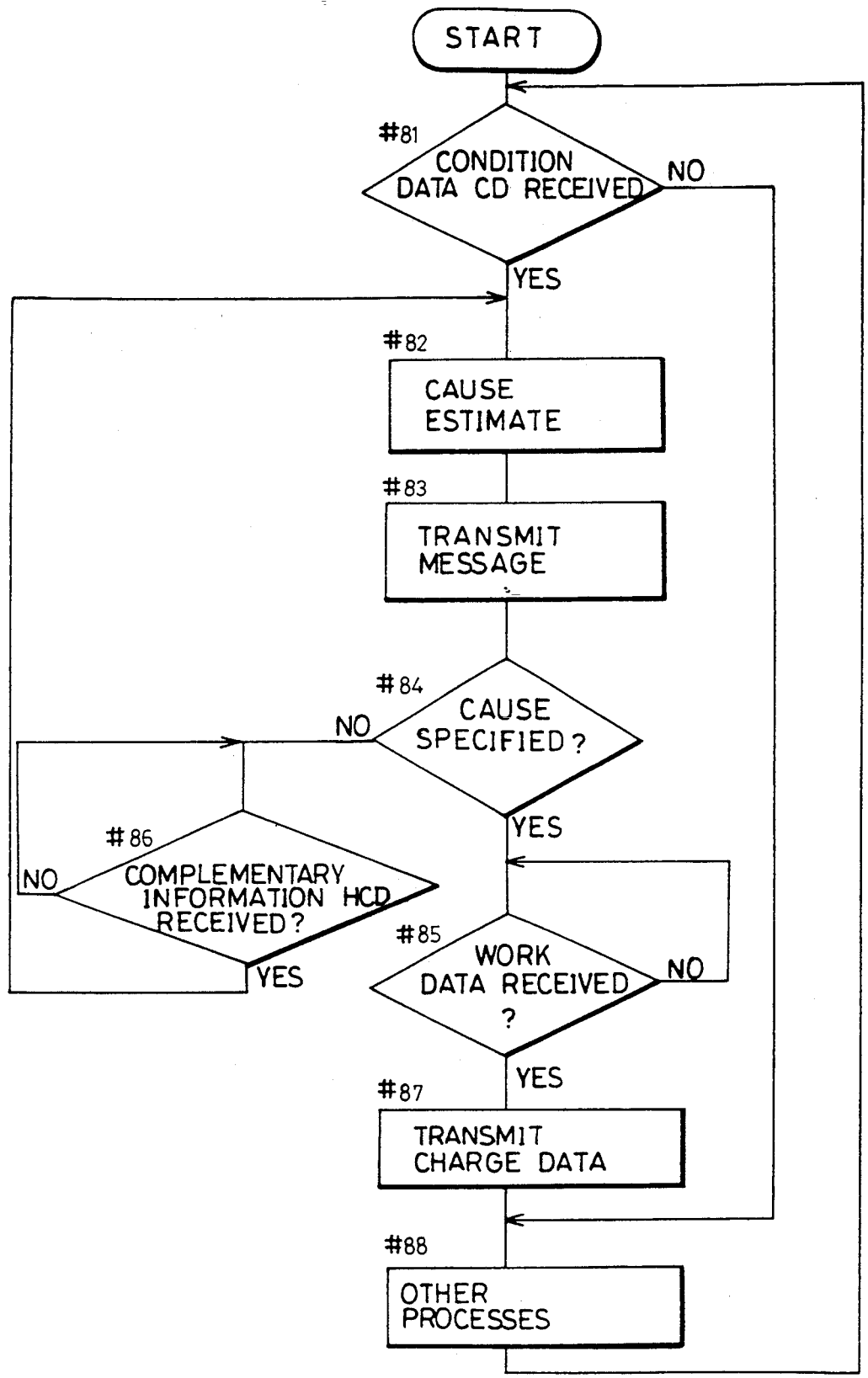
FIG. 18 is a flow chart diagram of a control routine of the control unit in accordance with the embodiment of the present invention.

FIG. 18 is a control flow chart diagram in the host computer 301 of the control unit 2.

First, in step #81, a determination is made as to whether the condition data CD from a copying machine has been received or not. When the data CD was received, in step #82, a cause of the trouble is estimated on the basis of the condition data CD, the complementary data HCD and a trouble data TT as described in steps #2, 5 and 7 of FIG. 9. When a cause has been estimated, a message corresponding to the estimate in steps #2, 5 and 7 of FIG. 9 are transmitted to the copying machine.

Next, in step #84, a determination is made as to whether a cause of the trouble has been specified or not. When a cause could not be specified, in step #86, a determination is made as to whether the complementary information HCD has been received or not. When the complementary information has been received, it returns to step #82, and a cause of a trouble is estimated again also with the complementary information. When a cause could be specified, in step #85, waiting for reception of the work data from a serviceman (YES in step #85), in step #87 the transmission routine for the charge data is carried out. Then, after other processings in step #88, it returns to step #81.

Figure 19:
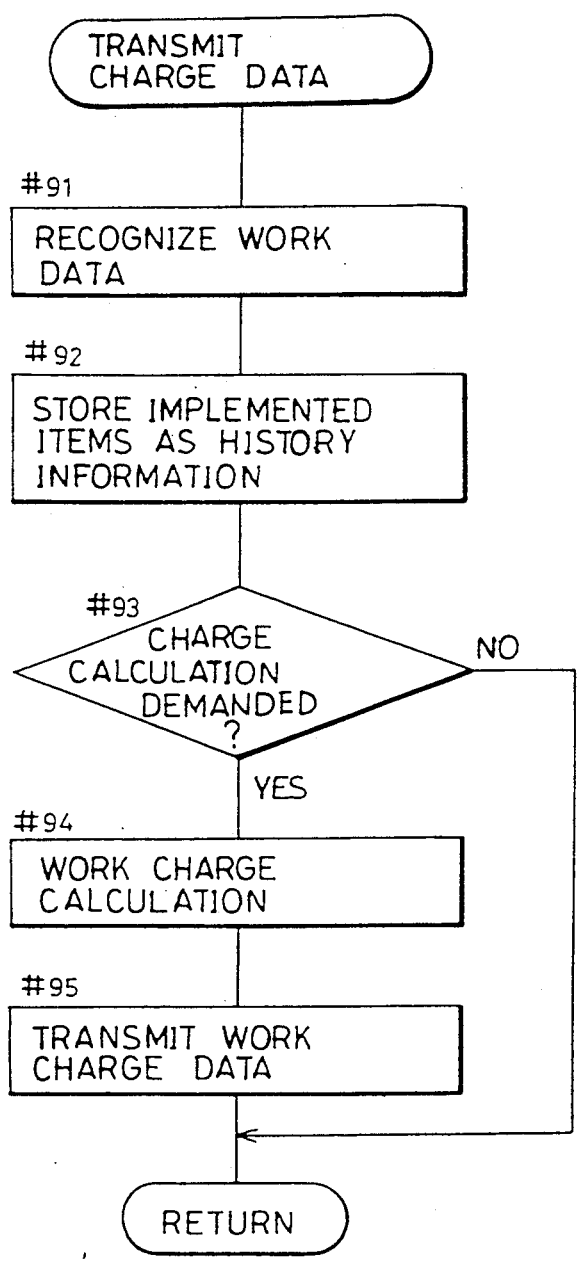
FIG. 19 is a flow chart diagram showing specific contents of a transmitting routine of the charge data of FIG. 18.

FIG. 19 is a flow chart diagram showing specific contents of the transmission routine of the charge data in step #87 of FIG. 18.

In step #91, the contents of the work data WD such as a user name, a machine number, a name of a serviceman, and implemented items are recognized.

Next, in a storage device in host computer 310, the implemented items are stored as history information in a corresponding region of a storage region provided for each machine number (step #92).

In the following step #93, a check is made to see if calculation of a work charge is requested from copying machine 1 by operation input of a serviceman or not.

If it is YES in stp #93, it proceeds to step #94 to calculate the work charge.

Then, the charge data RD corresponding to the calculated work charge is transmitted to copying machine 1 through modem 305 (step #95).

In copying machine 1, on the basis of the transmitted charge data RD, as shown in FIG. 17D, a message Z36 indicating the work charge is displayed in display 117.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus connectable to an external control unit through a communication line, comprising:
   means, associated with at least one element of said image forming apparatus, for generating a signal having a first value when maintenance work has been performed on said at least one element and a second value indicating that maintenance work has not been performed;
   first detecting means for detecting maintenance work performed by a serviceman on said image forming apparatus based on said generated signal;
   second detecting means for detecting operating parameters of said image forming apparatus;
   storing means for storing work data indicating the detected results by said first detecting means and parameter data indicating the detected results by said second detecting means; and
   transmitting means for transmitting at least said work data stored in said storing means to said control unit through said communication line.

2. The image forming apparatus according to claim 1, wherein said maintenance work includes parts replacement.

3. An image forming apparatus connectable to an external control unit through a communication line, comprising:
   means, associated with at least one element of said image forming apparatus, for generating a signal having a first value when maintenance work has been performed on said at least one element and a second value indicating that maintenance work has not been performed;
   detecting means for detecting performance of maintenance work for said image forming apparatus based on said generated signal;
   storing means for detecting performance of maintenance work for said image forming apparatus based on said generated signal;
   storing means for storing work data indicating the detected results by said detecting means;
   transmitting means for transmitting said work data stored in said storing means to said control unit through said communication line;
   receiving means for receiving charge data indicating a charge corresponding to said maintenance work transmitted from said control unit through said communication line; and
   outputting means for outputting said received charge data as a visible image.

4. An image forming apparatus connectable to an external control unit through a communication line, comprising:
   a photoreceptor;
   a charge for charging a surface of said photoreceptor;
   exposure means for forming an electrostatic latent image by irradiating light corresponding to an original image to said charge photoreceptor;
   developing means for developing said formed electrostatic latent image with toner;
   transfer means for transferring the toner image formed by said developing means on paper;
   fixing means for fixing said transferred toner image with heat on the paper;
   means, associated with at least one element of said image forming apparatus, for generating a signal having a first value when maintenance work has been performed on said at least one element and a second value indicating that maintenance work has not been performed;
   first detecting means for detecting replacement of an element of said image forming apparatus based on said generated signal;
   second detecting means for detecting operating parameters of said image forming apparatus;
   storing means for storing replacement data indicating the detected results by said first detecting means and parameter data indicating the detected results by said second detecting means; and
   transmitting means for transmitting the replacement data stored in said storing means to said control unit through said communication line.

5. The image forming apparatus according to claim 4, wherein said detecting means detects replacement of the photoreceptor.

6. The image forming apparatus according to claim 4, wherein said detecting means detects replacement of a developing device included in said developing means.

7. The image forming apparatus according to claim 4, wherein said detecting means detects replacement of a control circuit for operation control of said image forming apparatus.

8. The image forming apparatus according to claim 4, wherein said detecting means detects replacement of a part with an unused part.

9. The image forming apparatus according to claim 4, wherein said detecting means detects replacement of a part by a serviceman.

10. The image forming apparatus of claim 4, wherein said second detecting means detects a weight percentage of toner with respect to developer as a whole based on a permeability of the developer.

11. An image forming apparatus connectable to an external control unit through a communication line, comprising:
   operation input means provided on said image forming apparatus for inputting work data relating to contents of maintenance work by a serviceman in a first operating mode and for subsequently inputting image forming condition data relating to an image forming condition of said image forming apparatus in a second operating mode resulting from the performance of said maintenance work;
   setting means for setting an operating mode of said operation input means to one of said first and second operating modes;
   storing means for storing said work data inputted with operation of said operation input means; and
   transmitting means for transmitting the work data stored in said storing means to said control unit through said communication line.

12. The image forming apparatus according to claim 11, wherein said maintenance work includes replacement of a part.

13. The image forming apparatus according to claim 11, wherein said maintenance work includes cleaning of a part.

14. The image forming apparatus according to claim 11, further comprising receiving means for receiving charge data indicating a charge corresponding to the maintenance work transmitted from said control unit through said communication line, and outputting means for outputting said received charge data as a visible image.

15. A control system comprising a plurality of image forming apparatus and a control unit connected to each of said image forming apparatus through a communication line, wherein
   each of said image forming apparatus comprises;
      image forming means for forming an image on paper,
      guidance information receiving means for receiving guidance information for instructing procedure of maintenance work transmitted from said control unit through said communication line,
      outputting means for outputting the guidance information received by said guidance information receiving means as a visible image, and
      work data transmitting means for transmitting work data related to said maintenance work to said control unit through said communication line, and
   said control unit comprises;
      storing means for storing said guidance information,
      guidance information transmitting means for transmitting the guidance information stored in said storing means to said image forming apparatus through said communication line,
      work data receiving means for receiving the work data transmitted from said image forming apparatus, and
      means for updating the guidance information stored in said storing means on the basis of the data received by said work data receiving means.

16. The control system according to claim 15, wherein said guidance information includes information indicating a trouble portion of said image forming apparatus.

17. The control system according to claim 15, wherein said image forming apparatus further comprises operation means for inputting said work data.

18. The control system according to claim 15, wherein
   said image forming apparatus further comprises detecting means for detecting operation conditions of said image forming means, and condition data transmitting means for transmitting condition data corresponding to the operation condition detected by said detecting means to said control unit through said communication line,
   said control unit comprises condition data receiving means for receiving said transmitted condition data, and
   said guidance information transmitting means transmits guidance information corresponding to said received condition data in said stored guidance information to said image forming apparatus.

19. A control system of image forming apparatus comprising a plurality of image forming apparatus and a control unit connected to each of said image forming apparatus through a communication line, comprising:
   first storing means for storing guidance information for instructing a procedure of maintenance work of said image forming apparatus;
   display means provided in said image forming apparatus for displaying said stored guidance information;
   input means for inputting work data related to said maintenance work;
   second storing means for storing said inputted work data; and
   means for updating the guidance information stored in said first storing means on the basis of the work data stored in said second storing means.

20. A system comprising:
   a plurality of image forming apparatus for forming an image on paper;
   first storing means for storing plural pieces of guidance information for instructing procedures of maintenance work of said image forming apparatus;
   selecting means for selecting a piece of information among the plural pieces of guide information stored in said first storing means according to a condition of said image forming apparatus;
   display means provided in each of said image forming apparatus for displaying the guidance information selected by said selecting means; and
   a control unit connected to said image forming apparatus through the communication line; wherein
   each of said image forming apparatus comprises input means for inputting work data related to said maintenance work and transmitting means for transmitting said inputted work data to said control unit; and
   said control unit comprises receiving means for receiving said transmitted work data, second storing means for storing said received work data, and means for updating the guidance information stored in said first storing means on the basis of the work data stored in said second storing means.

21. A control system of image forming apparatus comprising a plurality of image forming apparatus and a control unit connected to each of said image forming apparatus through a communication line, wherein each of said image forming apparatus comprises;
an image forming means for forming an image on paper,
detecting means for detecting conditions of said image forming apparatus,
first transmitting means for transmitting first condition data corresponding to the detected results by said detecting means to said control unit,
operation input means for inputting second condition data indicating conditions of said image forming apparatus,
second transmitting means for transmitting said second condition data to said control unit;
guidance information receiving means for receiving first guidance information showing contents of said maintenance work and second guidance information showing a trouble portion of said image forming apparatus transmitted from said control unit through said communication line, and
output means for outputting the first and second guidance information received by said guidance information receiving means as a visible image: and said control unit comprises;
storing means for storing plural pieces of first and second guidance information,
condition data receiving means for receiving said transmitted first and second condition data,
first guidance information transmitting means for reading the first guidance information corresponding to said received first condition data from said storing means and transmitting the information through said communication line to said image forming apparatus, and
second guidance information transmitting means for reading said second guidance information corresponding to said received second condition data from said storing means and transmitting the same to said image forming apparatus through said communication line.

22. The control system according to claim 21, wherein
said image forming apparatus further comprises work data transmitting means for transmitting work data showing contents of maintenance work implemented for said image forming apparatus to said control unit, and
said control unit further comprises,
work data receiving means for receiving the work data transmitted from said image forming apparatus, and
means for updating the guidance information stored in said storing means on the basis of the work data received by said work data receiving means.

23. An image forming apparatus comprising:
a plurality of components for forming an image, one of said components attached to a main body of the apparatus detachably;
identifying means within said one component for indicating whether or not the component is unused; and
detecting means for detecting replacement of said detachable component with an unused component.

24. The image forming apparatus according to claim 23, wherein said apparatus is connectable to an external control unit through a communication line.

25. The image forming apparatus according to claim 24, further comprising:
transmitting means for transmitting data indicating the detected results by said detecting means to said control unit through said communication line.

26. The image apparatus according to claim 23, wherein said identifying means stops indicating the component as unused after the detecting operation of said detecting means.

27. An image forming apparatus connectable to an external control unit through a communication line, comprising:
operation input means provided on said image forming apparatus for inputting work data relating to contents of maintenance work by a serviceman in a first operating mode and for inputting image forming condition data relating to an image forming condition of said image forming apparatus in a second operating mode;
setting means for setting an operating mode of said operation input means to one of said first and second operating modes;
storing means for storing said work data inputted with operation of said operation input means;
transmitting means for transmitting the work data stored in said storing means to said control unit through said communication line; and
means for updating information stored at said control unit based on said transmitted data.

28. A system comprising an image forming apparatus and a control unit connected through a communication line to said image forming apparatus;
said image forming apparatus comprising:
image forming means for performing an image forming operation;
detecting means for detecting a physical quantity related to an operational condition of said image forming means; and
transmitting means for transmitting information indicating the physical quantity detected by said detecting means to said control unit through said communication line; and
said control unit comprising:
receiving means for receiving the information transmitted from said image forming apparatus through said communication line;
storing means for storing data representing a correspondence of the physical quantity to a probability of a predetermined malfunction; and
a processing device for providing the probability of the predetermined malfunction based on the information received by said receiving means;
said system further comprising:
display means for displaying the malfunction according to the probability thereof.

29. A system comprising an image forming apparatus and a control unit connected through a communication line to said image forming apparatus;
said image forming apparatus comprising:

image forming means for performing an image forming operation;

detecting means for detecting a physical quantity related to an operational condition of said image forming means; and transmitting means for transmitting information indicating the physical quantity detected by said detecting means to said control unit through said communication line; and said control unit comprising:

receiving means for receiving the information transmitted from said image forming apparatus through said communication line;

storing means for storing data representing a correspondence of the physical quantity to a probability of a predetermined malfunction and for storing a measure for solving the predetermined malfunction; and a processing device for providing the probability of the predetermined malfunction and the measure based on the information received by said receiving means;

said system further comprising:

display means for displaying the measure for solving the predetermined malfunction according to the probability of the predetermined malfunction.

30. A control system comprising an image forming apparatus and a control unit connected to said image forming apparatus through a communication line;

said image forming apparatus comprising:

image forming means for performing an image forming operation;

detecting means for detecting an operation condition of said image forming means;

command input means provided on said image forming apparatus for inputting a command;

condition data transmitting means for transmitting condition data corresponding to the operation condition detected by said detecting means to said external control unit through a communication line in response to the command inputted by said command input means, guidance information receiving means for receiving guidance information transmitted from said control unit through said communication line; and outputting means for outputting the guidance information received by said guidance information receiving means as a visible image;

said control unit comprising:

condition data receiving means for receiving said condition data transmitted by said condition data transmitting means; and guidance information transmitting means for transmitting guidance information according to the condition data received by said condition data receiving means.

* * * * *

UNITED STATES PATENT AND TRADEMARK OFFICE
CERTIFICATE OF CORRECTION

PATENT NO. : 5,303,005
DATED : April 12, 1994
INVENTOR(S) : Yoshiaki Takano et al It is certified that error appears in the above-indentified patent and that said Letters Patent is hereby corrected as shown below:

On the title page, item [75], delete "Kadotari Nishimori" and insert --Kadotaro Nishimori--

Signed and Sealed this

Twenty-seventh Day of December, 1994

Attest:

BRUCE LEHMAN

*Attesting Officer*     *Commissioner of Patents and Trademarks*